United States Patent
Acott et al.

(10) Patent No.: US 7,788,634 B2
(45) Date of Patent: Aug. 31, 2010

(54) METHODS AND SYSTEMS FOR EFFICIENT BEHAVIOR GENERATION IN SOFTWARE APPLICATION DEVELOPMENT TOOL

(75) Inventors: Troy S. Acott, Beaverton, OR (US); Joanna Mason, Portland, OR (US); Miguel S. Grinberg, Portland, OR (US); Stacy A. Monday, Vancouver, WA (US)

(73) Assignee: Ensequence, Inc., Portland, OR (US)

( * ) Notice: Subject to any disclaimer, the term of this patent is extended or adjusted under 35 U.S.C. 154(b) by 795 days.

(21) Appl. No.: 10/934,322

(22) Filed: Sep. 3, 2004

(65) Prior Publication Data

US 2006/0053443 A1 Mar. 9, 2006

(51) Int. Cl.
G06F 9/44 (2006.01)

(52) U.S. Cl. .................................. 717/104; 717/105

(58) Field of Classification Search ............... 717/104, 717/105
See application file for complete search history.

(56) References Cited

U.S. PATENT DOCUMENTS

| | | | |
|---|---|---|---|
| 5,050,074 A * | 9/1991 | Marca | 707/8 |
| 5,485,600 A | 1/1996 | Joseph et al. | |
| 5,555,369 A * | 9/1996 | Menendez et al. | 715/762 |
| 5,555,370 A | 9/1996 | Li et al. | |
| 5,574,843 A | 11/1996 | Gerlach, Jr. | |
| 5,600,778 A | 2/1997 | Swanson et al. | |
| 5,603,304 A | 2/1997 | Matczak | |
| 5,754,858 A | 5/1998 | Broman et al. | |
| 5,828,086 A | 10/1998 | Ishibashi et al. | |
| 5,842,020 A | 11/1998 | Faustini | |
| 5,872,974 A | 2/1999 | Mezick | |
| 5,883,639 A | 3/1999 | Walton et al. | |
| 5,986,652 A | 11/1999 | Medl et al. | |
| 5,999,173 A * | 12/1999 | Ubillos | 715/724 |
| 6,053,951 A | 4/2000 | McDonald et al. | |
| 6,088,028 A * | 7/2000 | Gipalo | 715/748 |
| 6,222,537 B1 | 4/2001 | Smith et al. | |
| 6,425,121 B1 * | 7/2002 | Phillips | 717/109 |
| 7,231,630 B2 * | 6/2007 | Acott et al. | 717/105 |
| 2004/0010771 A1 * | 1/2004 | Wallace et al. | 717/100 |

FOREIGN PATENT DOCUMENTS

| | | | |
|---|---|---|---|
| EP | 1380944 | * | 7/2003 |
| EP | 1380944 A2 | * | 7/2003 |
| EP | 1 380 944 A2 | | 1/2004 |

* cited by examiner

Primary Examiner—Wei Y Zhen
Assistant Examiner—Junchun Wu
(74) Attorney, Agent, or Firm—Black Lowe & Graham PLLC

(57) ABSTRACT

Methods, systems and computer product for allowing flexible definition of appearance and behavior states for an interactive application. A state table includes a first dimension and a second dimension, the first dimension configured to identify at least one programming element and the second dimension configured to identify a plurality of states of the computer system. When a state table creation operating mode is activated and alteration of at least one programming element is identified, an operand is automatically stored in a cell at each intersection of the first dimension and the second dimension. Alterations that are identified include movement of a graphical object, changes of size, color, associated text, or other graphical feature of a graphical object.

42 Claims, 14 Drawing Sheets

METHODS AND SYSTEMS FOR EFFICIENT BEHAVIOR GENERATION IN SOFTWARE APPLICATION DEVELOPMENT TOOL

FIELD OF THE INVENTION

This invention relates to software development and, more particularly, to software development systems and methods for developing interactive TV content.

BACKGROUND OF THE INVENTION

Computer technology has been steadily advancing in recent years, with computers becoming ever more powerful, and computer languages becoming ever more sophisticated. This combination has resulted in the desire and opportunity to create more complex computer programs, particularly involving graphical user interfaces and human-computer interaction. The power of computers has been linked with more advanced languages to create a class of meta-applications, software tools which facilitate the creation of software programs. An example of such a tool is Microsoft Visual Studio, which enables drag-and-drop visual design of an application interface, with subsequent automatic or semi-automatic generation of code for the corresponding application. Another example is Macromedia Flash, which reduces the need for the author to write code, relying instead on a powerful (but limited) set of capabilities for specifying the response of the application to particular user inputs, then generating the corresponding code statements to make those responses occur when the input is received.

A characteristic of user-interface-based applications is that each application provides a limited set of mechanisms for user input. For example, a user may press a key on a keyboard, move the representation of a mouse pointer across the screen, or push a mouse button. Each of these 'events' can be utilized to instigate the execution of a particular sequence of code statements, which cause some change in the internal state, visual appearance or manifest behavior of the application. Stringing such events and responses together constitutes the utilization of the application, with some hopefully-useful larger result accruing from the accumulation of such steps.

Some kinds of interactive applications are typified by transitions among similar but discrete states of appearance. The application 'window' may for example display a set of buttons, one of which appears differently than the others by a color change (highlighting) or by a change in content (e.g., a tick mark overlaid on the button). As the user of the application provides input, the elements in the display change. As a typical example, the user might press a navigational arrow key, and in response, the appearance of the set of buttons will change so that the highlighting appears to move from one button to another. Such an action might be employed to allow the user to select among a number of mutually-exclusive options, and when the selection is finalized (indicated for example by the user pressing the 'Return' key), the program executes a particular behavior based on the selection.

The visual design tools that have been developed to create such applications solve a number of fundamental problems for the author. The tools often create the basic framework for the application, including the event recognition and dispatching code, and insert code statements to define the components which establish the initial visual appearance of the application on the computer screen, including for example, buttons, check boxes, text boxes with scroll bars, and so forth. Generally with such tools the appearance of the application can be statically defined, with limited automatic code generation for dynamic changes to the application.

An exception to this is the Macromedia Flash development tool. This tool allows for the definition of multiple states or appearances of the application, which can be selected by means of temporal sequencing, or in response to user input. An object or a collection of visual elements arranged on the screen is called a 'frame' or 'scene', and a frame can be displayed by a code statement in the ActionScript language of Flash. When an object such as a Button can have multiple states of behavior or appearance, each such state is represented by a discrete frame, and the selection of a particular frame enables control over the appearance and/or behavior of the object. Because ActionScript provides a full set of algorithmic capabilities, complex behaviors can be built up by the author. However, the display and appearance of multiple discrete objects must still be managed by an explicit linear sequence of code statements.

A static initial appearance can be defined within the context of the development tool, and the code (or data) which creates that appearance is automatically generated. In some tools, other static renderings of the scene, or of objects in the scene, may be created by the author using the tool, with automatic code or data generation. However, the selection among such static renderings must be manually established by the author. More subtle changes, which are not captured in static renderings, are exclusively under programmatic control, and must be manually generated.

The current technology for automatic generation of application appearance and behavior suffers from a second problem inherent in the approach described above. The Macromedia Flash development tool permits the description of multiple static frames for an object or collection of graphic elements. Some sequences of frames are shown in a fixed order—the author may define an animation consisting of a sequence of movements or transformations of graphic elements comprising a scene. In such cases, the animation may be efficiently encoded as a sequence of differences, or a sequence of algorithmic transformations, from one frame to the next. Such sequential encoding reduces the data requirements for storing the animation. For the frames which comprise a general object representation, however, this storage efficiency is lost because the transition among the various object frames is entirely arbitrary. In the course of the application, an object may change from one appearance mode to another, each mode being one of the statically-defined frames for the object. In order to display the newly-selected frame, all of the attributes of the frame must be available to enable the generation of the appropriate graphical appearance on the display, since (from the point of view of the development tool) the identity of the previous mode (and thus the value of each attribute in the frame) is arbitrary.

Consider the following description of an example interactive television application with reference to FIG. 1. Once the application is started, the viewer is presented with a display containing three buttons, one of which is highlighted. Pressing directional keys on the remote control causes the highlighting to move among the buttons. Pressing a special selection key on the remote control causes the application to display an image, where the content of the image is based on the button which was highlighted when the selection key was pressed.

The author might wish that pressing a certain remote control key, when the highlighting is on a particular button, causes highlighting to pass to another button according to the following table:

| Initial highlighted button ↓ | Remote control key pressed by viewer | | | |
|---|---|---|---|---|
| | Left | Right | Up | Down |
| Button 1 | Button 1 | Button 2 | Button 1 | Button 3 |
| Button 2 | Button 2 | Button 1 | Button 2 | Button 3 |
| Button 3 | Button 1 | Button 2 | Button 1 | Button 3 |

A conventional way of achieving this behavior is for the author to write explicit code statements to accomplish the required changes. For each state (that is, for each button which might be highlighted), the code statements would have to test for each possible remote control key, and depending on the actual key pressed, make changes to the properties of two buttons as required. The following pseudo-code fragment depicts one manner in which this might be accomplished:

```
FunctionToHandleButtonpress (int iKey)
    if ( Button1.Highlighted )
        if ( iKey == iKeyRight )
            Button1.Highlighted = False
            Button2.Highlighted = True
        else if ( iKey == iKeyDown )
            Button1.Highlighted = False
            Button3.Highlighted = True
    else if ( Button2.Highlighted )
        if ( iKey == iKeyLeft )
            Button2.Highlighted = False
            Button1.Highlighted = True
        else if ( iKey == iKeyDown )
            Button1.Highlighted = False
            Button3.Highlighted = True
    else
        if ( iKey == iKeyLeft )
            Button3.Highlighted = False
            Button1.Highlighted = True
        else if ( iKey == iKeyRight )
            Button3.Highlighted = False
            Button2.Highlighted = True
        if ( iKey == iKeyup )
            Button3.Highlighted = False
            Button1.Highlighted = True
    Return
```

If additional property changes were desired, such as moving the button, changing the displayed image, or hiding the buttons, more hand-written code would be required.

If the author wanted to change more than one parameter of a button, for each additional parameter to be changed, two statements would be required per if-else block. In this example, this would mean an additional 14 lines of code for each parameter to be affected.

Another approach to the automatic generation of behavior for this application, typified by the Macromedia Flash tool, is to describe a sequence of three frames, each of which contains one highlighted button and two non-highlighted buttons. Each frame would contain all the data required to describe the desired appearance. Then, for each frame, the effect of a button press would be to specify the next frame (which in some cases is identical to the current frame). This transition logic could be contained in a data table similar to Table 1 above. Upon a frame transition, all of the properties associated with that frame would be imposed on the elements of the application, regardless of whether those particular properties had changed from the previous frame or not. An event handler can then be structured to select among the possible frames, using a data matrix constructed from Table 1. This simplifies the event handler, but still requires that object values in each frame be defined one at a time.

Therefore, there exists a need to provide systems and methods to easily identify and code graphical or functional behavior states in an interactive application.

SUMMARY OF THE INVENTION

The present invention provides methods, systems and computer product for allowing flexible definition of appearance and behavior states for an interactive application.

The preferred form of the present invention provides at least one state table having a first dimension and a second dimension, the first dimension configured to identify at least one programming element and the second dimension configured to identify a plurality of states of the computer system. When a state table creation operating mode is activated and alteration of at least one programming element is identified, an operand is automatically stored in a cell at each intersection of the first dimension and the second dimension In accordance with further preferred aspects of the invention, identifying alteration of at least one programming element includes identifying movement of a graphical object, changes of size, color, associated text, or other graphical features of a graphical object within a state creation display window from a location in a previous state.

In accordance with other preferred aspects of the invention, the programming element includes a function call. The function call includes an automatic function call and the operand includes data used by the automatic function call.

BRIEF DESCRIPTION OF THE DRAWINGS

The preferred and alternative embodiments of the present invention are described in detail below with reference to the following drawings.

DETAILED DESCRIPTION OF THE INVENTION

Embodiments of the present invention provide methods and systems for creating state tables. At least one programming element is listed along a first dimension and a plurality of states of the computer system are listed along a second dimension of the state table. At each intersection of the first dimension and the second dimension is a cell in which an operand is specified for the programming element at each state. The operand listed for a current state is used in defining computer system operation.

Figure 1:
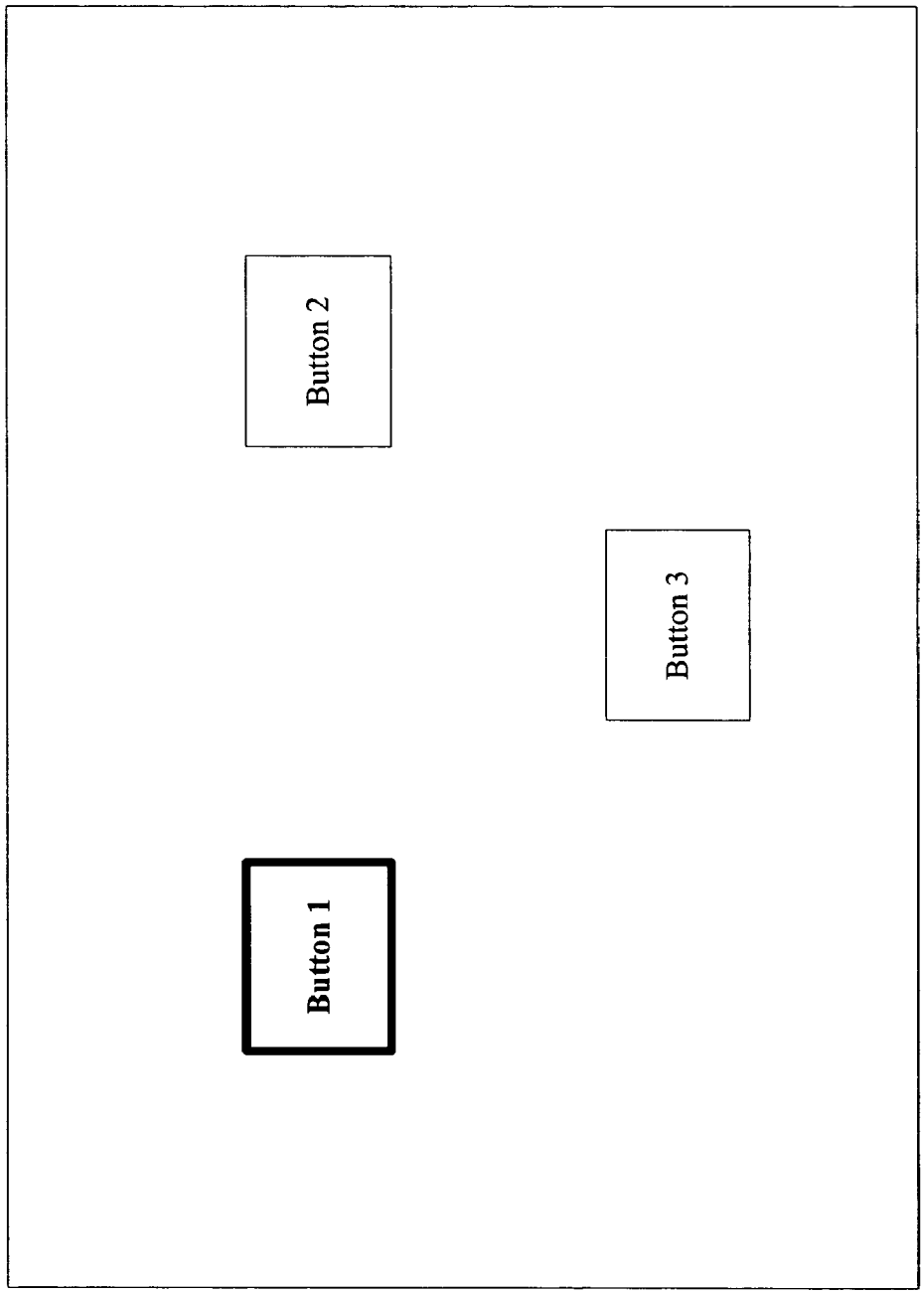
FIG. 1 is a screen shot illustrating a prior art process.
Figure 2:
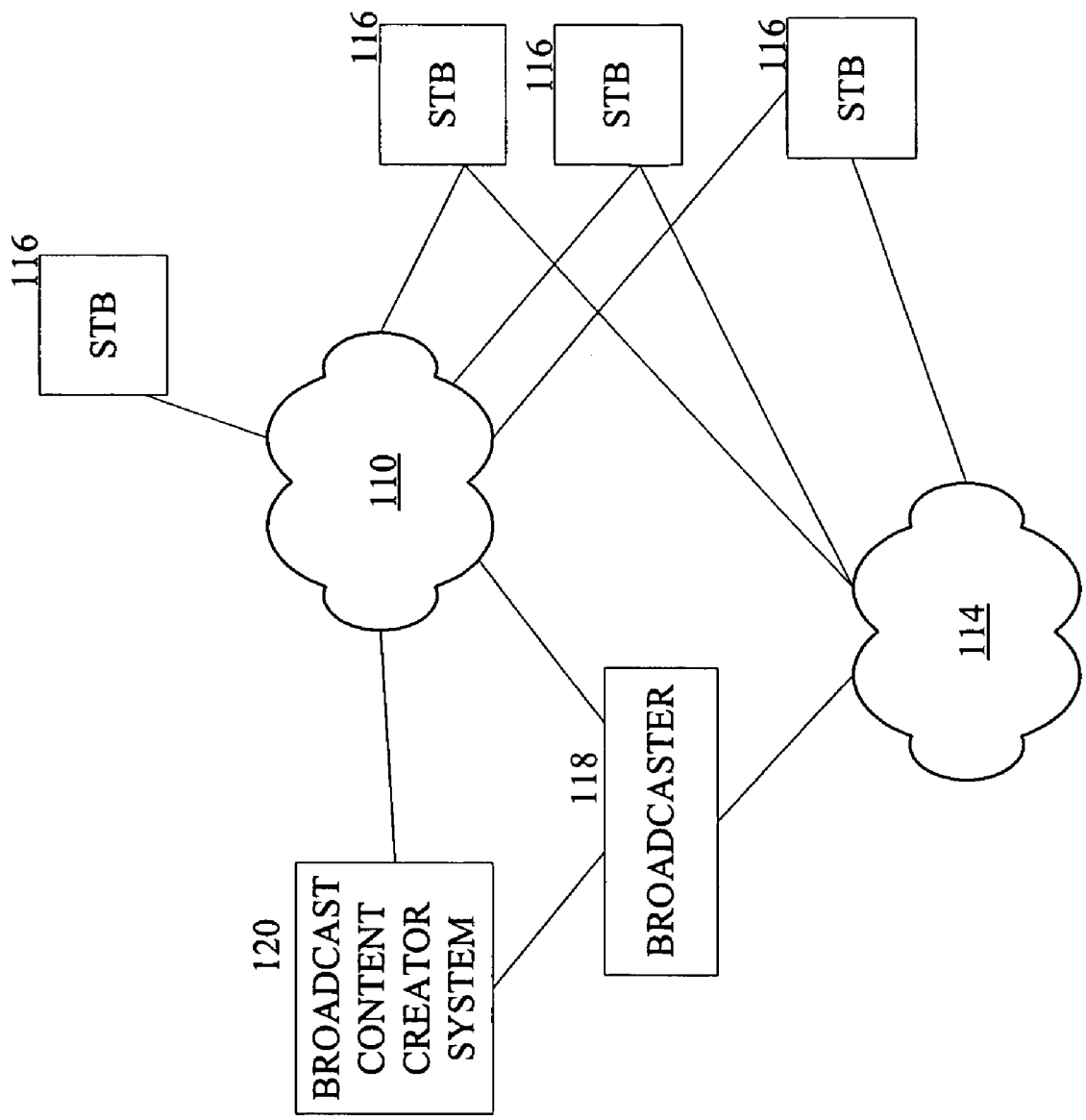
FIG. 2 is a diagram of a system for using the interfaces generated by the present invention.

FIG. 2 shows a system 100 that allows users having a computer based system 116, such as a Set-Top Box (STB) or other media control system, to receive digital broadcast content and associated digital content from a broadcast content creator system 120 over a network 110. As will be described in more detail below, the broadcast content creator system 120 generates states that are the constructs for creating the digital content that is associated with the broadcast content and interacted on by the users. The broadcast content creator system 120 may transfer the created digital content to a separate delivery system (e.g. broadcaster 118) for subsequent broadcast or other transmission over the network 110 or over a digital broadcast network 114, such as digital cable, satellite, or other digital broadcast network.

Figure 3:
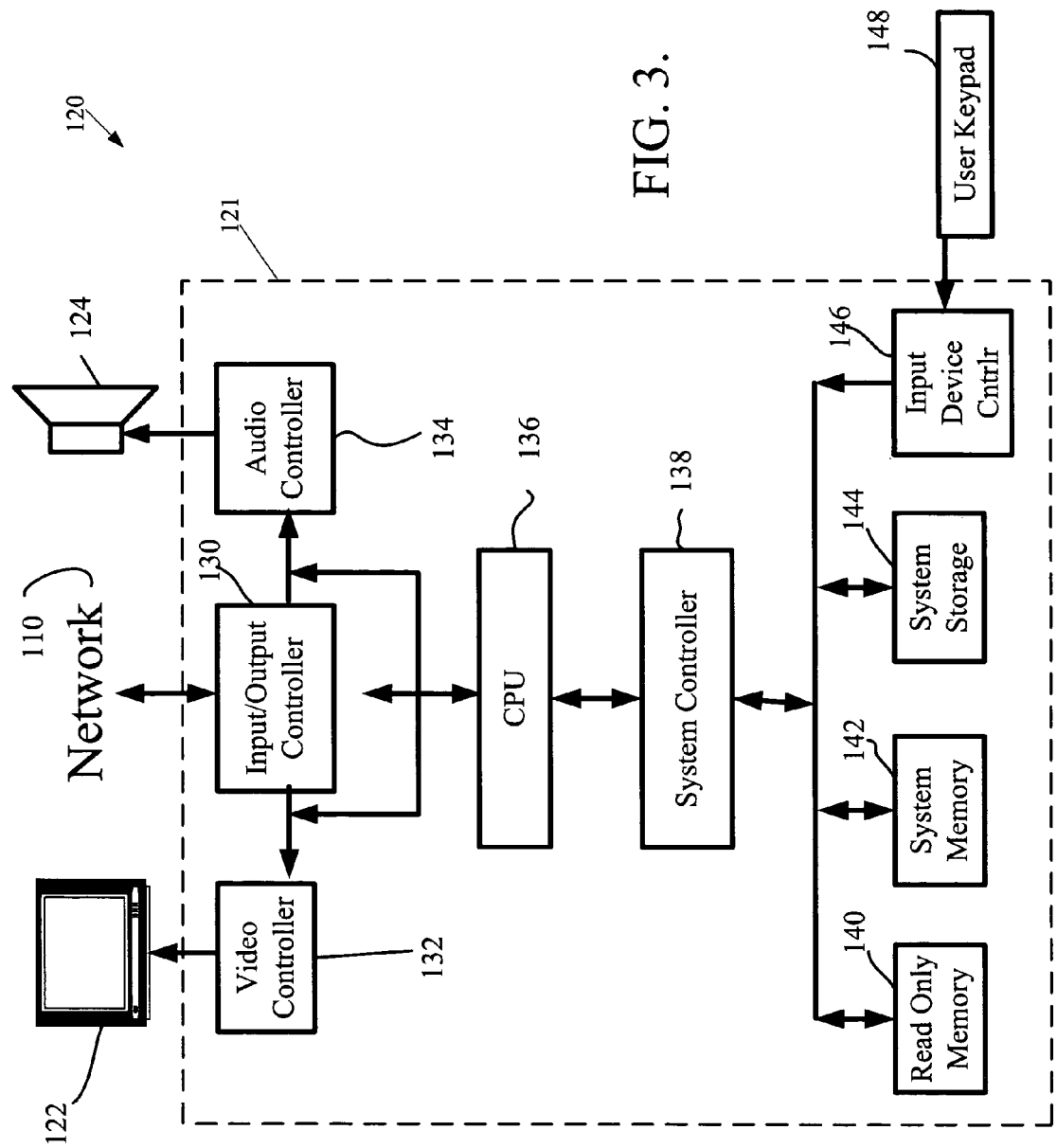
FIG. 3 is a block diagram of a computer system for performing the present invention.

As shown in FIG. 3, the system 120 includes a computer system 121 (e.g., a general purpose digital computer) that is operable for controlling a display 122 with a video controller 132 and an audio subsystem 124, such as a stereo or a loudspeaker system, with an audio controller 134. The computer system 120 outputs digital content data to the network 110, such as a broadband data network, via an input/output controller 130. In one embodiment, the outputted data is sent to the broadcaster 118 (FIG. 2) that combines the data with corresponding broadcast content and sends the combination over the broadcast network 114 (FIG. 2). The computer system 121 also receives input from a wired or wireless user keypad 148 or other type of data entry device. The system 120 includes a software application program for creating state tables or state table files.

In one embodiment, the input/output controller 130 is a multiplexer for routing video data blocks, audio data blocks, and other data blocks routed through and/or generated by the system 121 to a central processing unit (CPU) 136 for processing and multiplexing. The CPU 136 communicates through a system controller 138 with input and storage devices such as read only memory ("ROM") 140, system memory 142, system storage 144, and an input device controller 146. The system 121 can generate and/or transmit data blocks over the network 110.

Figure 4:
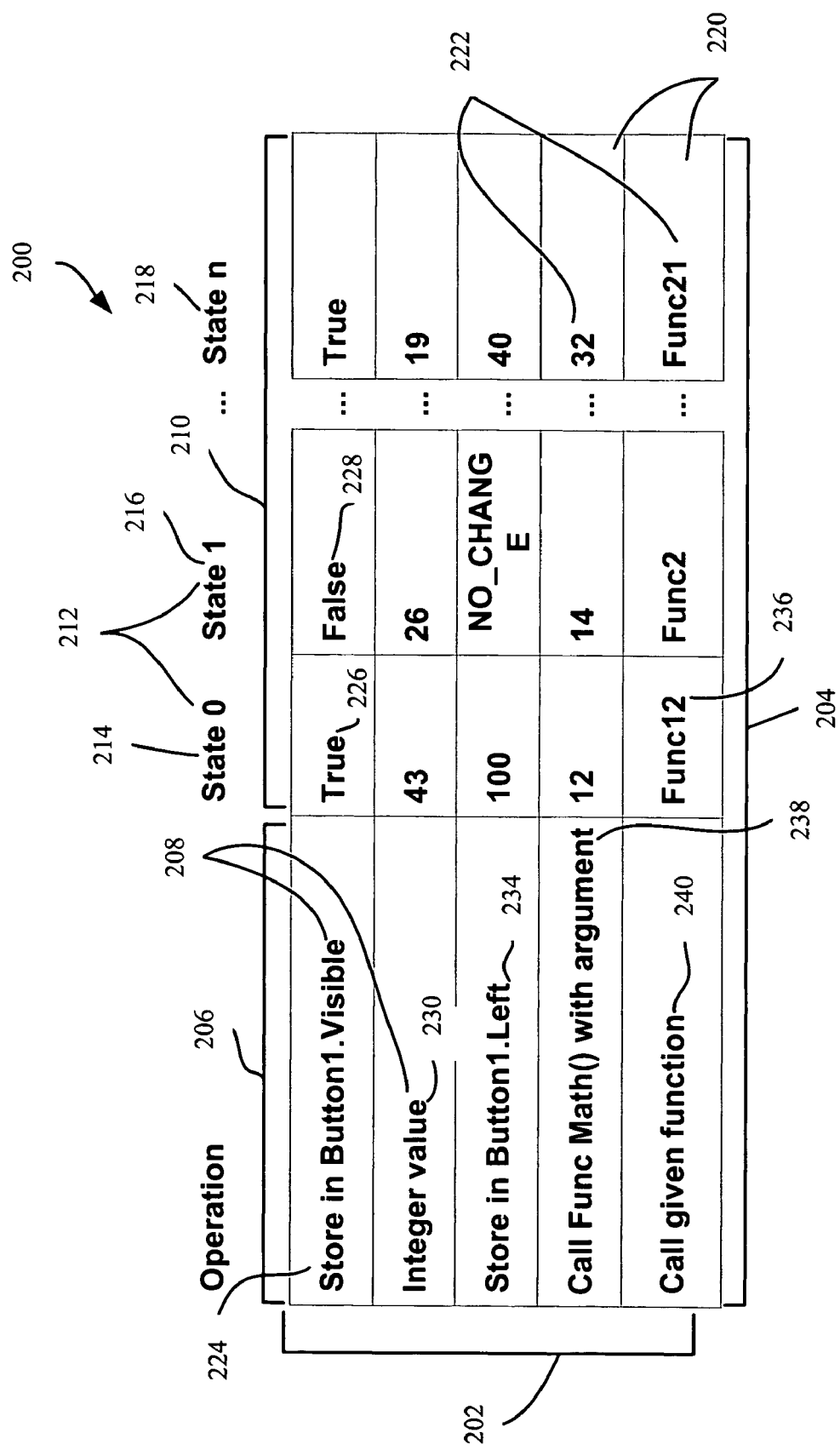
FIG. 4 is a diagram illustrating a state table generated by systems and processes formed in accordance with the present invention.

FIG. 4 shows an example state table 200 that is created in accordance with an embodiment of the present invention. The state table 200 has five rows 202 and n+2 columns 204. The first column 206 is a list of operations or programming elements 208. As a result, any number of the rows 202 may be used as desired for a particular application as determined by the number of operations or programming elements 208 listed in the first column 206. The remaining columns 210 correspond with each of n+1 states 212 of operation that are contemplated for the behavior of the system using the state table. There are n+1 states because the first state is State 0 214. Thus, if the last state is State n 218, there are a total of n+1 states. There are n+2 columns because there are n+1 states and the additional first column is for the list of programming elements.

At intersections of each of the rows 202 and each of the columns 208 after the first column 206 are cells 220 containing operands 222. In each cell 220 is listed an operand for the programming element specified in the first column 206 for that row. Thus, there are n+1 operands 222 specified for each programming element 208 listed in the first column 206 of each row 202, one for each contemplated state, State 0 214 through State n 218. The operands 222 specify an argument needed for the programming element at each of the states 212.

Operation can begin at a non-state (not shown) or with State 0 214. Upon initiating State 0 214 and upon progressing to each state 212, the programming element 208 in each row is executed according to the operand 222 specified in the cell 220 for that programming element 208 at that state 212. In the embodiment shown in FIG. 4, the programming elements each are executed sequentially, from top to bottom, although any order could be selected as desired for a particular application. The states 212 can be stepped through sequentially from State 0 214 through State n 218, or can be randomly accessed. Initiation of state changes results from the passage of time, in response to system or user initiated directives, or based on other changing conditions. The state table 200 thus can be adapted to a variety of applications and contexts.

Given by way of non-limiting example, the first programming element listed in the first row 230 of the first column 206 is "Store in Button1 Visible" element 224. For the sake of this non-limiting example, a button represents a displayed icon, having a particular position, size, and appearance, which a user of the system 116 can select to direct the system 116 according to his or her desires. The programming element 208 represents an automatic function call, one of a number of programming element types. The "Store in Button1.Visible" element 224 accepts two operands 222: a "True" operand 226, as specified at State 0 214 and a "False" operand 228, as specified at State 1 216. While the operands "True" 226 and "False" 228 are spelled out, they could be represented by numerical codes, one-byte symbols, and other forms. In response to the True operand 226 and the False operand 228, the element 224 causes Button 1 to become visible at State 0 214, but become invisible at State 1 216. A transition from State 0 214 to State 1 216 may be indicated by expiration of a set time interval, receipt of a state change signal by the system running the state table, a user initiating a state change by pressing a button or otherwise issuing a command, or in other ways. The data table manifested in the state table 200 thus dictates program behavior in response to state changes.

The state table 200, however, need not execute only one row and thus one programming element at a time. The state table 200 causes to be executed each programming element listed for each operand specified for each state. By way of this non-limiting example, for this state table 200 with five rows 202 of programming elements 208, up to five programming elements are executed for each state change, as will be further described. At State 0 214, the first programming element "Store in Button1.Visible" element 224 first is executed with the "True" operand 226. Second, the programming element "Integer Value" 230, a value-setting programming element, sets the value to 43. Third, the programming element "Store in Button1.Left" 234, another automatic function call, sets the left-hand position of Button 1 to 100. Fourth, the "Call Func Math( ) with argument" programming element 238 specifies that function Math( ) is executed with the argument 12. Finally, the "Call given function" programming element 240 initiates the function specified by operand 236 at State 0 214, namely "Func12," which will then be executed. It will be noted that this programming element is a function call that is not an automatic function call as are programming elements 224 and 234. Instead of the programming element 208 specifying the function to be executed, the function to be executed is specified by the operand 236. Using a non-automatic function call advantageously allows for different functions to be executed by the state table for different applications by changing only operands in the state table, without changing the programming elements. As will be described further below, this allows the state table structure to be reused between different applications while changing only the state table data.

Upon the transition to the next state (State 1 216), the programming elements 208 are executed according to the operand specified for each programming element at this state, with one exception noted in the example. First, the "Store in Button1.Visible" element 224 is executed with the operand "False" 228, thereby making the button invisible. Second, the programming element "Integer Value" 230 sets the value to 26. This value can be read by program code. Third, the "Store in Button1.Left" programming element 234, this time, is not executed. This is because there is a null operand "NO_CHANGE" specified for the element 234 for the current state. When a null operand is specified for a programming element, the programming element is skipped. Therefore, a vast number of programming elements could be specified, even if some of them are seldom used, and the programming elements are merely skipped until transitioning to a state where a non-null operand is specified. Fourth, the "Call Func Math( ) with argument" programming element 238 calls the function Func( ) with argument 14. Finally, the "Call given function" programming element 240 initiates the function Func2 specified for the programming element 238 at State 1 216.

As the programming elements 208 are executed (or not executed, if a null operand is associated with the programming elements 208 for a current state change), no conditions need to be tested, let alone coded. The desired behaviors are encapsulated in the state table 200 to manifest and control the execution of the system based on the operands coded for each of the programming elements.

Transitions between the states can be controlled in a number of ways. For example, arguments could be supplied with the operands specifying whether the transition is to be made abruptly, faded in, wiped from one side or the other, or another way. Similarly, the speed of transitions or a duration during which the state change remains in effect could be specified by an argument. Default transition types and durations could be supplied if such arguments are not specified.

Figure 5:
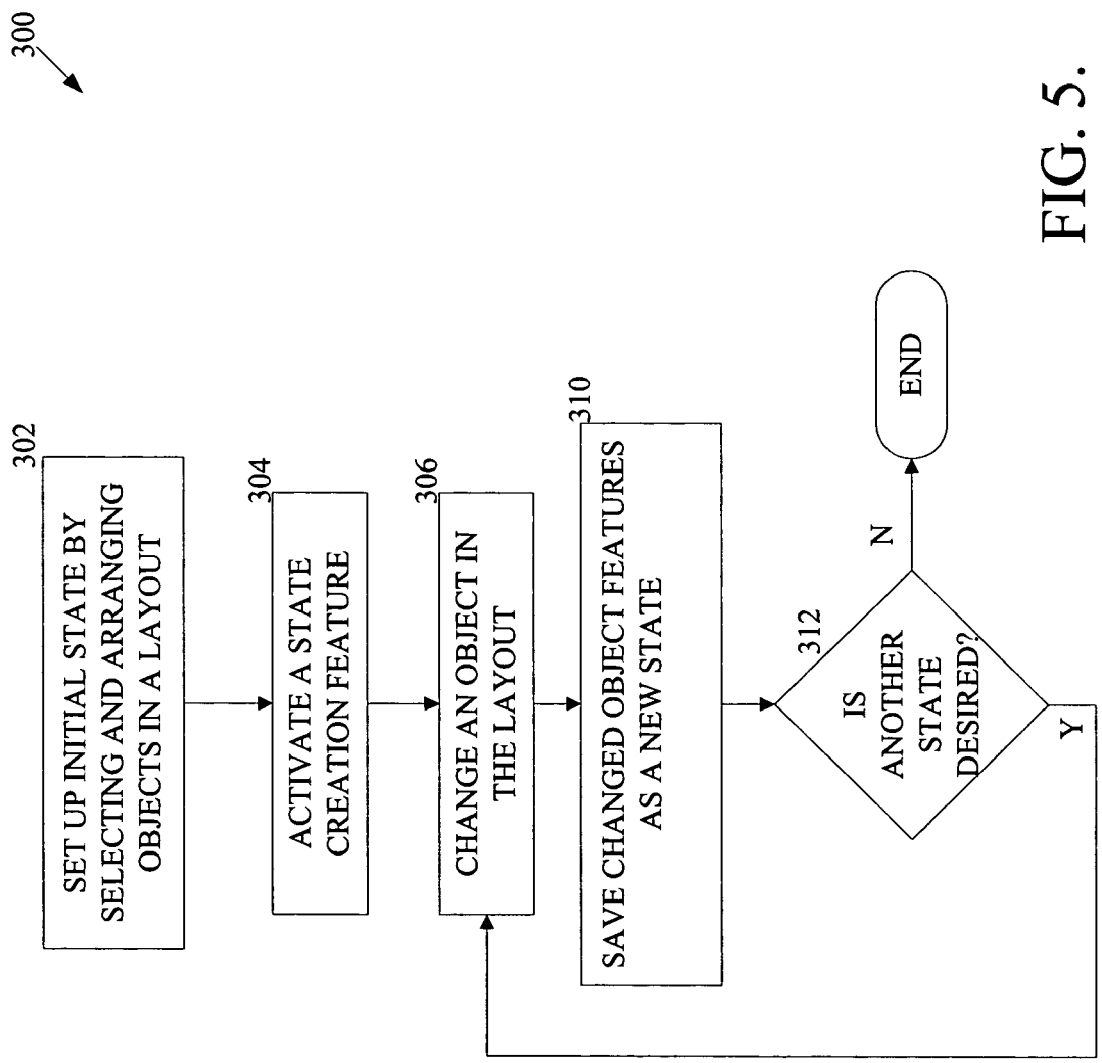
FIGS. 5-7 are flow diagrams illustrating processes for generating state tables in accordance with embodiments of the present invention.

FIG. 5 illustrates an exemplary process 300 formed in accordance with the present invention for creating state tables, such as those described above. First, at a block 302, an operator of the system 120 arranges and edits objects, such as text blocks, buttons, images into a display area. The user may also leave the display area blank at the step identified in the block 302. At a block 304, the user activates a state creation feature. All of the features that are presently displayed in the display area are then identified as the initial state, but are not included within the state table until the user has manipulated a change to an object presently in the display area (block 306). At a block 310, the user decides that the changes that they have made to the objects are to be saved as a new state. Different examples of saving changed objects as new states are shown and described in FIGS. 6 and 7. At a decision block 312, more and more object states are created as the user manipulates the objects and is complete when the user determines to no longer create any new states.

Figure 6A:
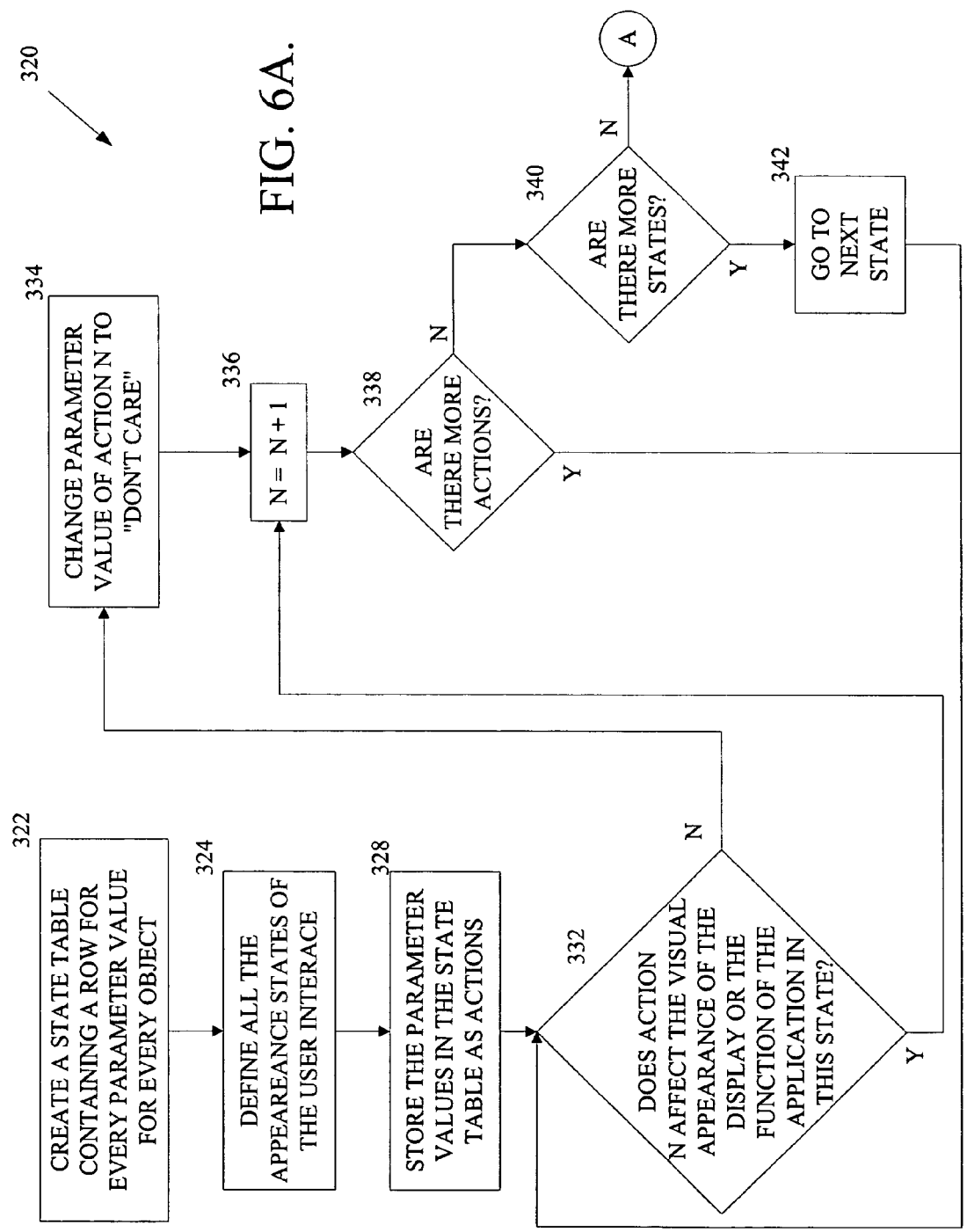
Figure 6B:
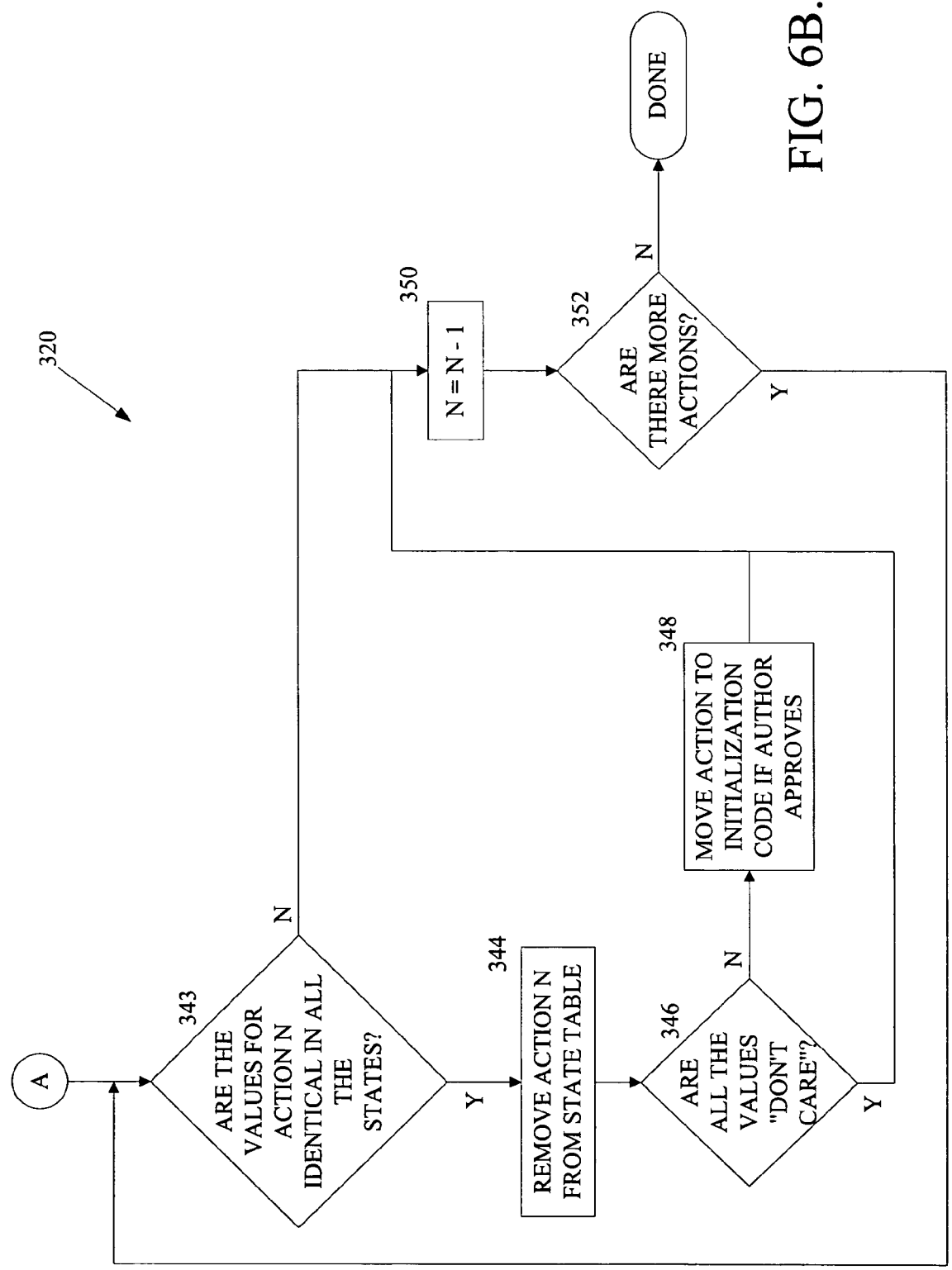

FIGS. 6A and 6B illustrate a process 320 for saving a state table as performed by the system 120. First, at a block 322, a state table is created that identifies the setting of every parameter of every object within an initial state. At a block 324, the user changes the features as desired for creating new states of the user interface. Once all the states have been defined, the process 320 continues to a block 328. The values of all the parameters for all the objects in all of the states of the user interface are stored in the state table as actions. At a decision block 332, the process 320 determines if an action N affects the visual appearance of the display or the function of the application in the state in which the action appears. If the action end does not change the parameter value, a "don't care" is applied to the parameter, see block 334 and the process 320 progresses to a block 336. If the action N does affect the visual appearance of the display or the function of the application in the present state, the process 320 moves to the block 336 and increases the present value of N by one. At a decision block 338, the process 320 determines if there are more actions to review. If there are more actions to review, the process 320 returns to the decision block 332 to analyze action N (the next action). If at the decision block 338, the process 320 determines that there are no more actions to review, the process 320 continues to a decision block 340 that determines if there are more states to analyze. If there are more states to analyze, the process 320 continues to the next state at a block 342 and returns to the decision block 332.

Referring now to FIG. 6B, if there are no more states to analyze at the decision block 340, the process 320 continues to a decision block 343 to determine if the values for action N is identical in all of the states. If the values are identical for action N, the process 320 removes action N from the state table, see block 344, and continues onto a decision block 346. At the decision block 346, the process 320 determines if all of the values for the action N that has just been removed are "don't care" values. If all the values are not determined to be "don't care," the process 320 moves the action N to initialization code under author approval, see block 348. After the block 348, if all of the values for action N are determined "don't care" at the decision block 346, or not all of the values for the action N are identical in all the states at the decision block 343, the process 320 continues to a block 350 that reduces N by one. Then, at a decision block 352, the process 320 determines if there are more actions to analyze. If there are no more actions, the process is done, and if there are more actions, the process 320 returns to the decision block 343.

Figure 7:
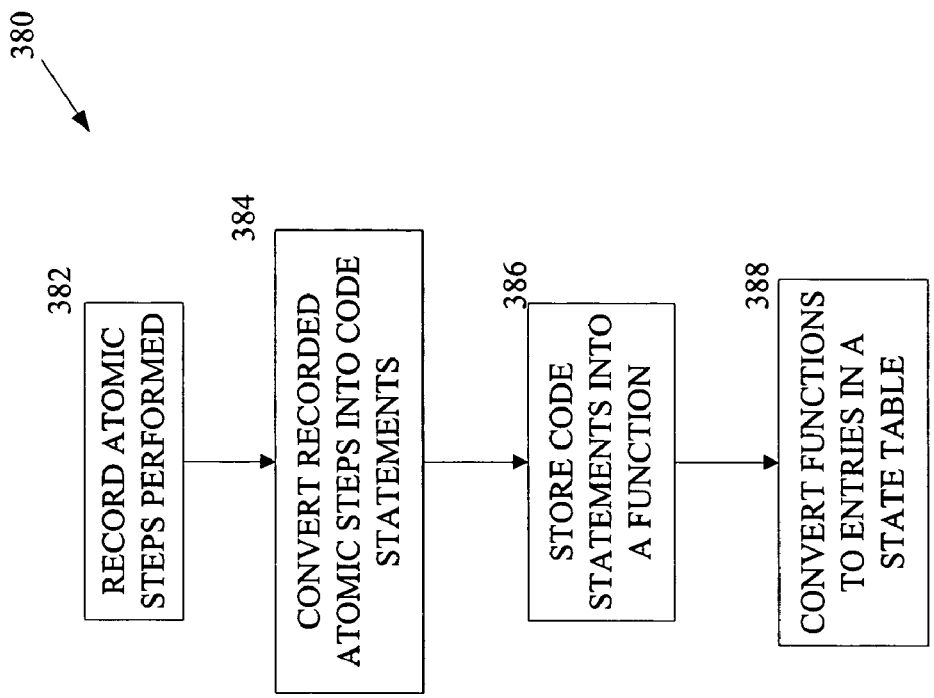

FIG. 7 illustrates an alternate method 380 for populating a state table. First, at a block 382, atomic steps performed by a user are recorded. Atomic steps include any change made to objects in a work/design area associated with the application program. Atomic steps include things such as moving a button, changing a color, or changing an image. At a block 384, the recorded atomic steps are converted into code statements. At a block 386, the code statements are stored into a function. At a block 388, the functions are converted to entries in a state table.

For example, when changing from state 0 to state 1, a button is moved to a new location, generating the function statements:

Button1.Left=100

Button1.Top=20 then change the button color:

Button1.FillColor=28 and transform the text displayed in the button:

TranslateStringToSpanish(Button1.Label).

These changes are all gathered into the following function:

Function_0_to_1( )

Button1.Left=100

Button1.Top=20

Button1.FillColor=28

TranslateStringToSpanish(Button1.Label)

End

In another state, state 2 the size of the button, the color of the button and the text are changed as follows:

Function_1_to_2( )

Button1.Width=125

Button1.Height=80

Button1.FillColor=20

Button1.TextColor=14

End

These are placed into a state table as follows:

| Operation | State 0 | State 1 | State 2 |
|---|---|---|---|
| Call function | no_operation | Function_0_to_1 | Function_1_to_2 |

The state transitions must occur in sequential order.

In another embodiment, an action list is converted into a state table entry. The action list includes a sequence of actions when converting from one interface state to another state. The sequence of actions are only those actions needed to get the object from the last state to the present state instead of just the value of the parameter of the object. The state table includes a linear list of operations, which correspond to the sequence of actions. For each action list, the application program makes a new operation sequence commensurate with an existing action sequence. This may be done by rearranging the operations in the new sequence to match the old sequence when possible, then placing any unmatched operations at the end of the new sequence and expanding the state table to include the new operations. When expanding the state table, any new cells created (corresponding to the operation to be taken when transitioning to a particular state) would be set to the 'do nothing' default.

For example, using the functions described above, the functions are ordered and matched where possible:

| Function_0_to_1 | Function_1_to_2 |
|---|---|
| Button1.Left = 100 | <empty> |
| Button1.Top = 20 | <empty> |
| Button1.FillColor = 28 | Button1.FillColor = 20 |
| TranslateStringToSpanish(Button1.Label) | <empty> |
| <empty> | Button1.Width = 125 |
| <empty> | Button1.Height = 80 |
| <empty> | Button1.TextColor = 14 |

The state table is generated as follows:

| Operation | State 0 | State 1 | State 2 |
|---|---|---|---|
| Store in Button1.Left | NO_CHANGE | 100 | NO_CHANGE |
| Store in Button1.Top | NO_CHANGE | 20 | NO_CHANGE |
| Store in Button1.FillColor | NO_CHANGE | 28 | 20 |
| Store in TranslateStringToSpanish | NO_CHANGE | Button1.Label | NO_CHANGE |
| Store in Button1.Width | NO_CHANGE | NO_CHANGE | 125 |
| Store in Button1.Height | NO_CHANGE | NO_CHANGE | 80 |
| Store in Button1.TextColor | NO_CHANGE | NO_CHANGE | 14 |

Again the state transitions must be sequential.

Figure 8:
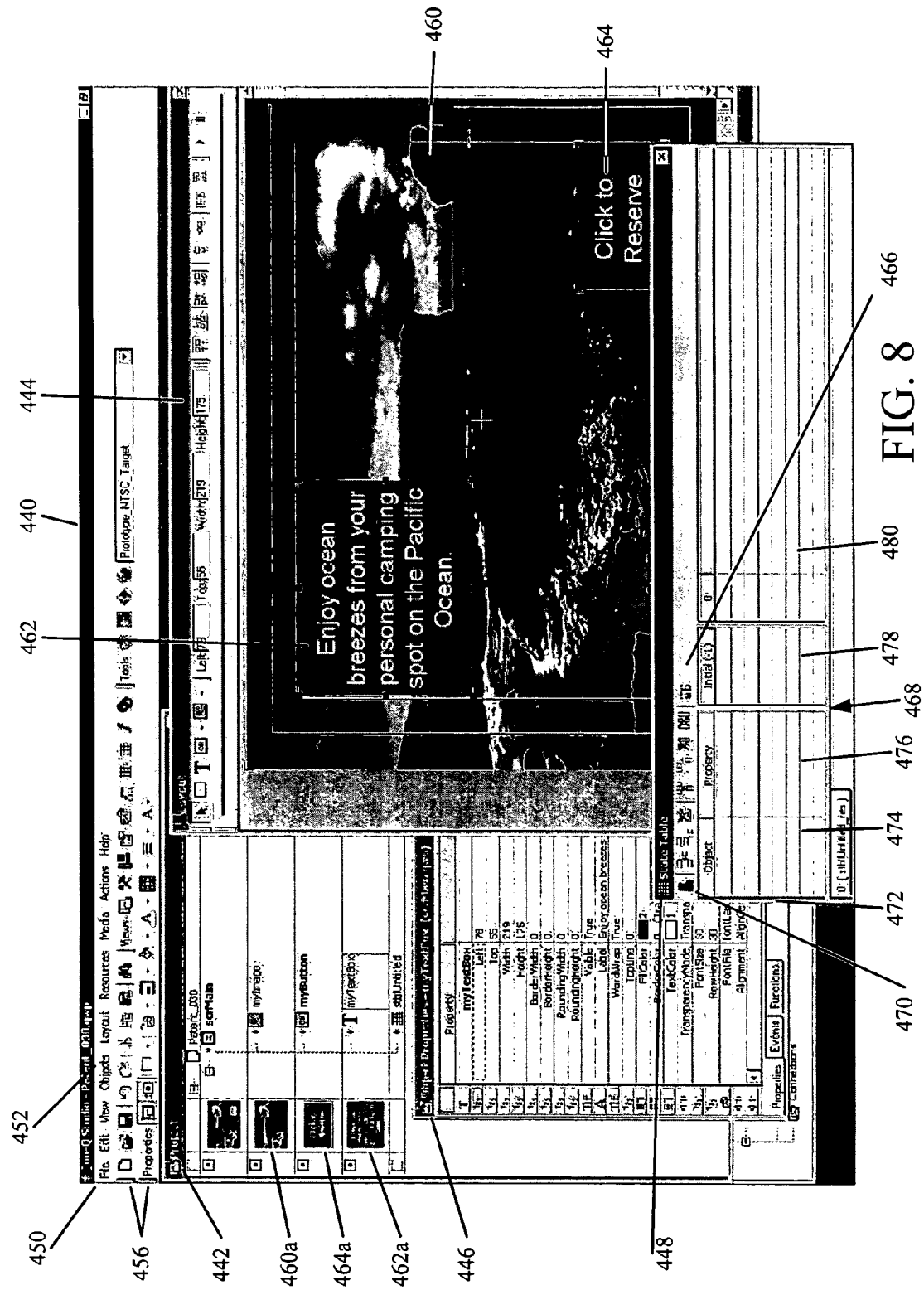
FIGS. 8-13 are screen shots of a graphical user interface formed in accordance with an embodiment of the present invention.

FIG. 8 illustrates a screen display or window 440 generated by the application program executed by the system 120. The window 440 allows a user to generate a state table in accordance with the present invention. The window 440 includes a pull-down menu section 450 and a button bar 456. The window 440 also includes a layout window 444, a project window 442, an object properties window 446, and a state table window 448. In this embodiment, the layout window 444 is used to generate user interfaces that are to accompany a program. The user has inserted a textbox 462, a button 464, and an image 460 into the layout window 444, moved them to desired locations, and edited the text within the respective boxes. The user selects features and objects to be presented in the layout window 444 by either selection of specific buttons in the button bar 456, by selecting an object from an object pull-down menu 452 located in the pull-down menu section 450, or by some other means. Once an object has been selected and placed in the layout window 444, the object is presented in the project window 442. For example, the user has selected and placed the image 460, the textbox 462, and the button 464 into the layout window 444 and in the project window 442. The objects appearing in the layout window 444, and the objects appear as thumbnails 460a, 462a, and 464a in rows in the project window 442.

When a user highlights or otherwise selects an object listed in the project window 442 or in the layout window 444, the object properties window 446 presents in table form the properties of that object. In this example, the user has activated the textbox 462 in the project window 442, thereby presenting in the object properties window 446 all the attributes associated with the textbox 462.

The state table window 448 includes a button bar 466 having a create states button 470 and a state table section 468. The state table section 468 includes rows 472 that display a number for each of the attributes of the objects that were changed between two or more recorded states. The state table section 468 also includes an object column 474, an object property/attribute column 476, an initial state column 478, and created state columns section 480. The initial state column 478 records the value of an object property/attribute after an object property/attribute has been changed with the create states button 470 being activated. The value presented in the initial state column 478 is the value of the attribute or property before the change of the object has occurred (i.e., initial state).

Figure 9:
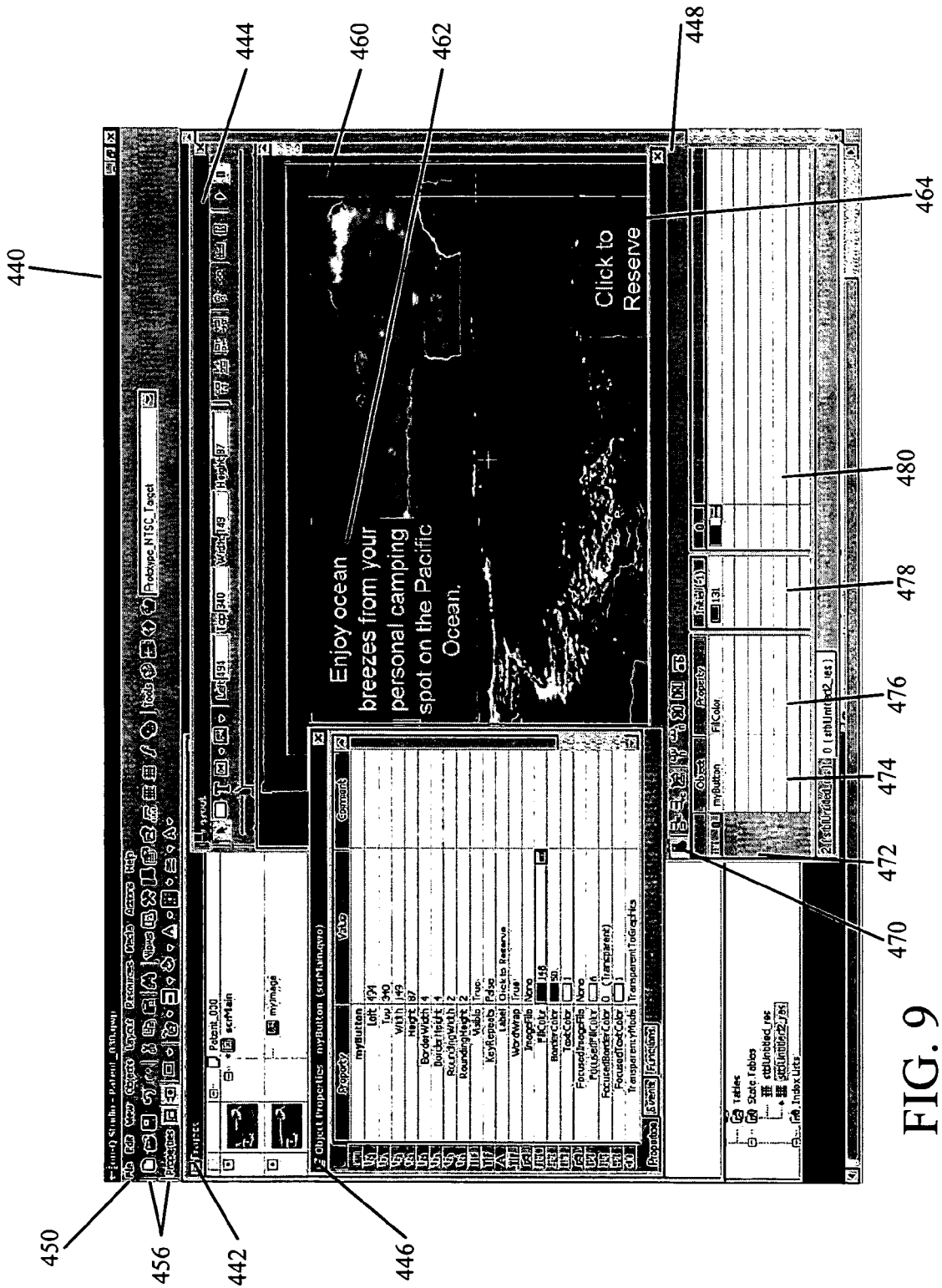

As shown in FIG. 9, the user has selected a create states button 470. This begins the automatic state table creation process. Either within the object properties window 446 or the layout window 444, the user has selected the button 464 for change and thus for automatic recordation into the state table window 448. In this example, the user has changed the fill color of the button 464 by either changing the fill color attribute within the object properties window 446 to present and select a change fill color function, or by activating a cursor on the button 464 within the layout window 444 or by just selecting the button 464 within the layout window 444 and selecting a fill color button or function included within the button bar 456 or the pull-down menu section 450. Once the fill color has changed, the original fill color of the button 464 is recorded and listed into the initial state column 478 and the new fill color is recorded into a State 0 column as shown in the state columns section 480.

Figure 10:
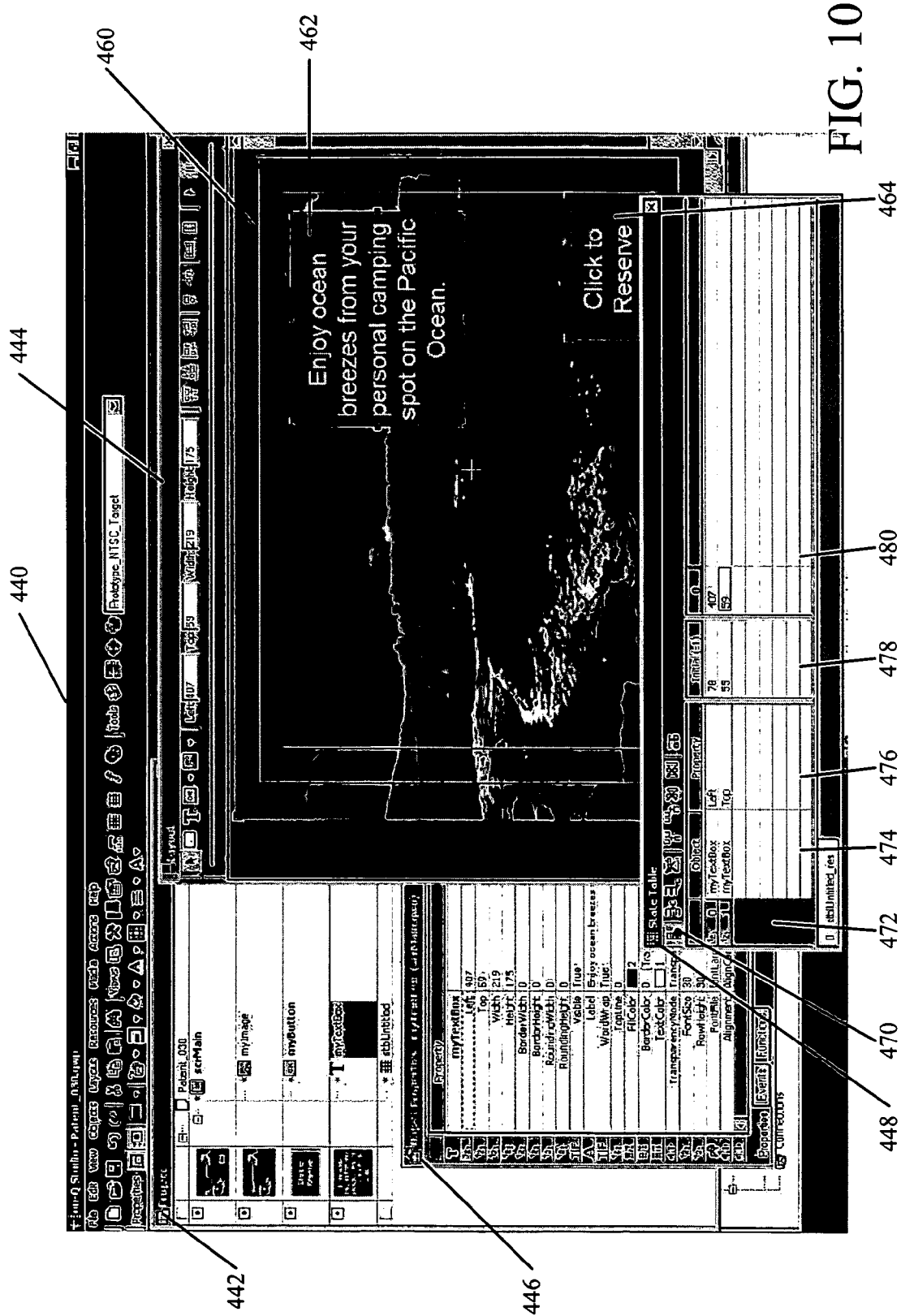

In a further example, as shown in FIG. 10, the user has moved the textbox 462 to the right side of the layout window 444 while the create states button 470 has been activated. Since the only properties or attributes of the textbox 462 that have been changed are the position of the textbox 462, the only properties that are recorded into a new state (State 0) are the position attributes that include left and top position values.

The initial state column 478 presents the original left and top values and new State 0 shown in the state columns section 480 includes the new left and top values for the textbox 462.

Figure 11:
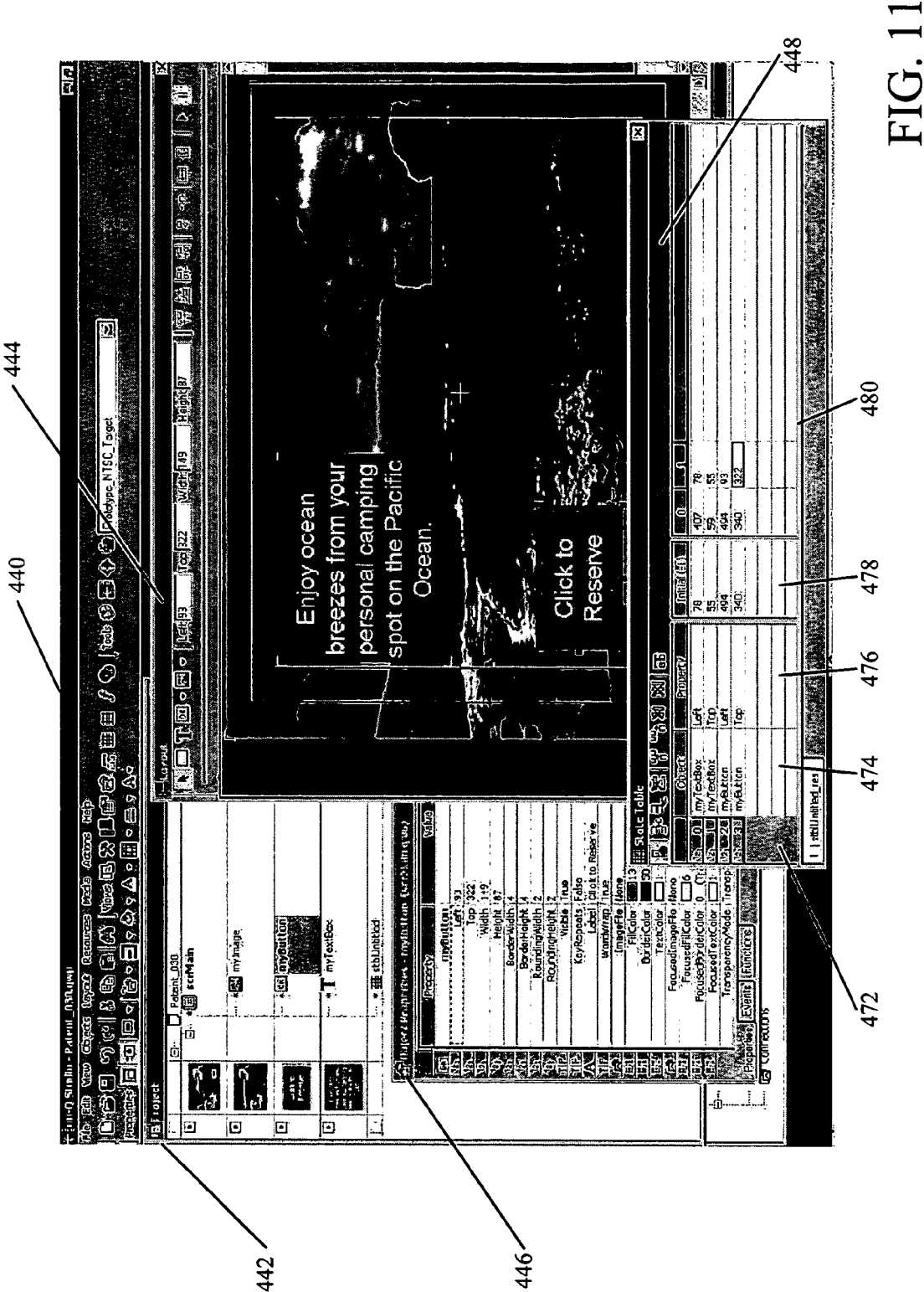

FIG. 11 illustrates a second State 1 that is created after the first State 0 has been completed. In this example, each new state is created from the initial state. In the second State 1, the user has moved the button 464 to the left side of the layout window 444. Therefore, because the textbox 462 has not been changed from the initial state, but is different than the first State 0 shown in FIG. 10, the initial state values for left and top are stored in State 1. Also, whenever an object property changes, a value will be recorded for those properties in all of the states in the state columns section 480. Therefore, because the button properties (left and top) only changed in the second State 1, the initial values for the properties of the button 464 in the first State 0 are the same as the values for the button 464 from the initial state shown in the initial state column 478.

Figure 12:
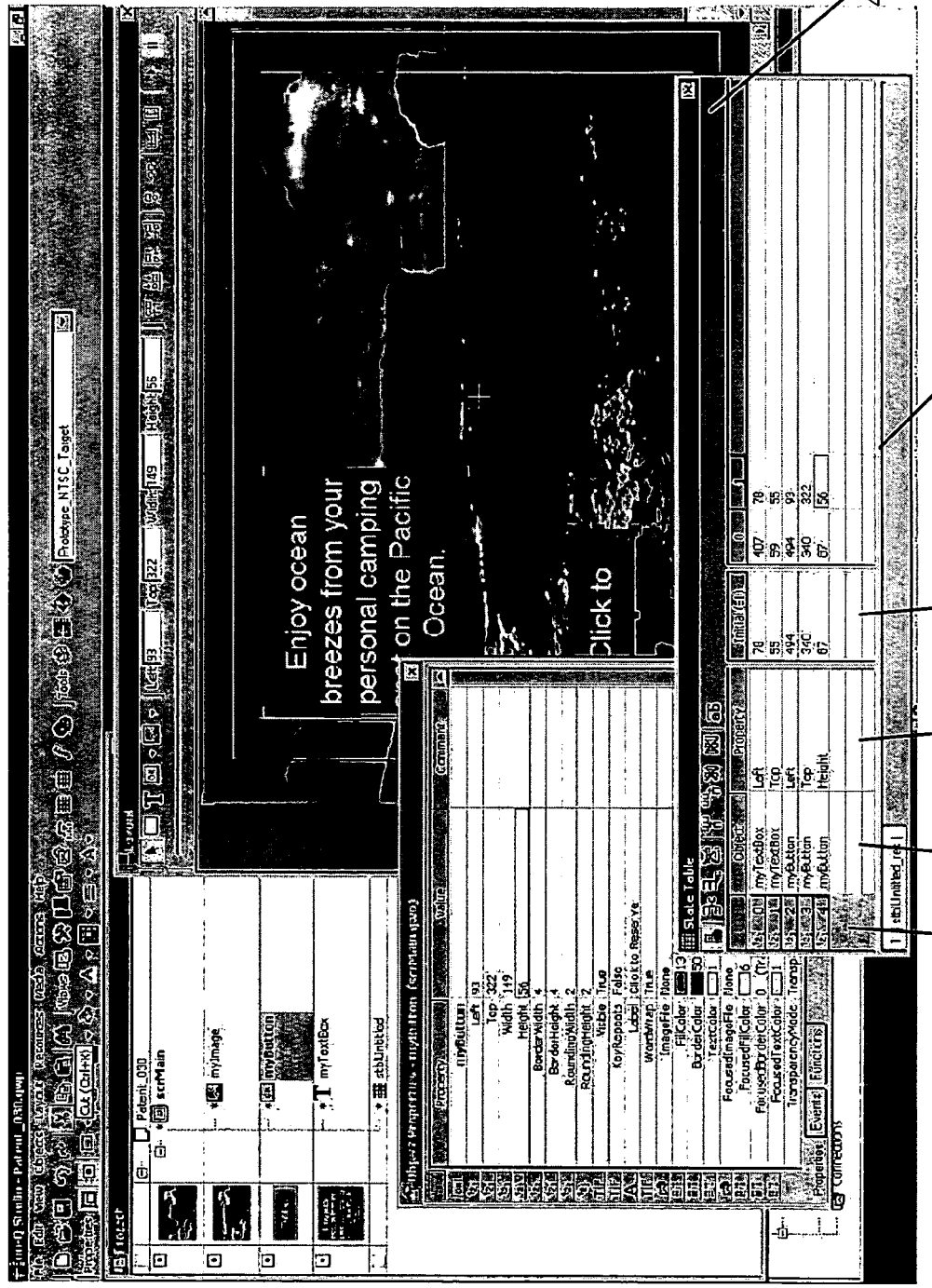

Referring to FIG. 12, before a state is completed, other values of properties may be changed at any time and as they are changed, they are added to the presently open state column in the state columns section 480. As shown, the user has reduced the height of the button 464, thereby causing the application program to automatically enter the new height value into the second State 1 and record the initial height value for the button 464 into the first State 0.

Figure 13:
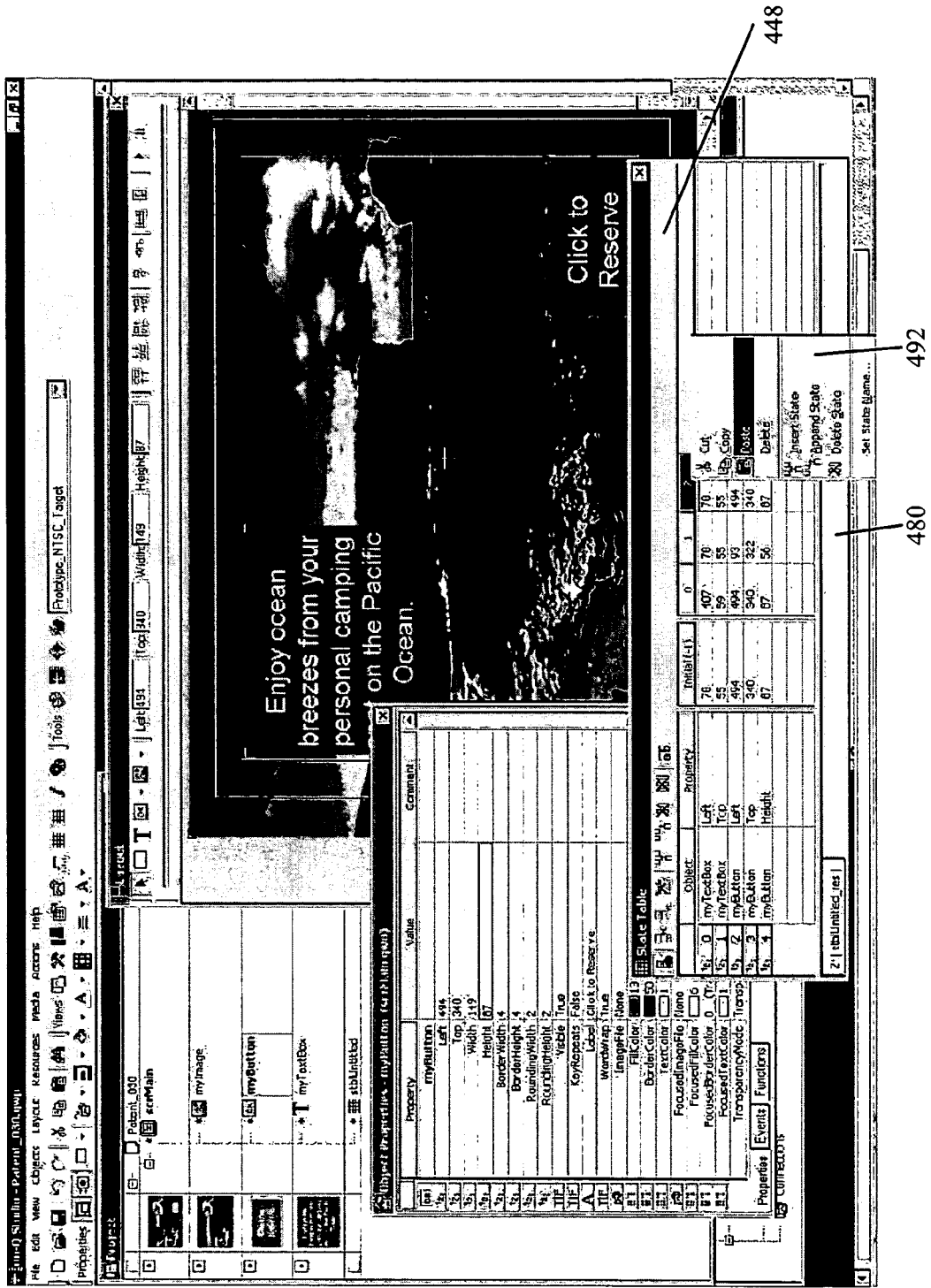

As shown in FIG. 13, when interacting in the state table window 448, the user can present a pop-up window 492. The pop-up window 492 includes a number of functions and can be activated a number of different ways, such as activating a mouse button or a specific key on a keyboard. The pop-up window 492 illustrates copy and paste functions that allow states to be copied and pasted as new states. For example, the user has copied the values in the initial state column 478 and pasted the copied values into a third State 2. The pop-up window 492 also includes an insert state function, an append state function, a delete state function, and a set state name function. Selection of the insert state function presents a new state into the state columns section 480 to the immediate left of the presently highlighted or activated state in the section 480. Selection of the append state function presents a new state into the state columns section 480 to the right of the other states in the section 480. Selection of the delete state function deletes the presently highlighted or activated state. Selection of the set state name function allows the user to change the name of the presently highlighted or activated state that is shown at the top of the column for that state.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for creating a state table comprising:
   providing an interactive interface for designing an application having at least one programming element, the interactive interface further having a project window, a selectable layout window, and a first selectable input to activate a state table creation operating mode;
   providing at least one state table having a first dimension and a second dimension, the first dimension configured to identify the at least one programming element and the second dimension configured to identify a plurality of states of the computer system;
   activating the state table creation operating mode by selecting the first selectable input, the activation of the state table creation operating mode causing the display of a state table window;
   and during the state table creation:
      automatically determining the programming element being modified graphically by a user, the programming element having one or more parameters;
      automatically determining the one or more parameters of the programming element that was modified;
      automatically including an operand corresponding to the graphically modified programming element and modified parameter into the state table; and
      automatically storing the operand corresponding to the modified parameter of the programming element as a specific state in the state table.

2. The method of claim 1, wherein identifying alteration of at least one programming element includes identifying movement of a graphical object within a state creation display window from a location in a previous state.

3. The method of claim 1, wherein identifying alteration of at least one programming element includes identifying changes of size of a graphical object within a state creation display window.

4. The method of claim 1, wherein identifying alteration of at least one programming element includes identifying alteration of graphical features of a graphical object within a state creation display window.

5. The method of claim 4, wherein the graphical features include color.

6. The method of claim 4, wherein the graphical features include image content.

7. The method of claim 1, wherein identifying alteration of at least one programming element includes identifying alteration of at least one of text or text features associated with a graphical object within a state creation display window.

8. The method of claim 1, wherein the programming element includes a function call.

9. The method of claim 8, wherein the function call includes an automatic function call.

10. The method of claim 9, wherein the operand includes data used by the automatic function call.

11. The method of claim 8, wherein the operand includes a call given function indicating what function should be executed by the function call programming element.

12. The method of claim 1, wherein the programming element includes a value setting function.

13. The method of claim 1, wherein the operand includes a null operand.

14. The method of claim 1, further comprising sending the state table with stored one or more operands over a broadcast network.

15. A computer program product residing on a computer non-transitory readable medium, the product comprising:
   first computer program code for providing an interactive interface for designing an application, the interactive interface including a project window and a selectable layout window;
   second computer program code for providing, upon activation of a selectable state table creation operating mode, at least one state table in a state table window, the at least one state table having a first dimension and a second dimension, the first dimension configured to identify at least one programming element and the second dimension configured to identify a plurality of states of the computer system;

third computer program code for automatically determining the programming element being modified graphically by a user, the programming element having one or more parameters;

fourth computer program code for automatically determining the one or more parameters of the programming element that was modified;

fifth computer program code for automatically including an operand corresponding to the graphically modified programming element and modified parameter into the state table; and sixth computer program code for automatically storing the operand corresponding to the modified parameter of the programming element as a specific state in the state table, wherein the third thru sixth computer program codes are executed during state table creation.

16. The computer program product of claim 15, wherein the alteration of the at least one programming element is performed by a user within the layout window, and further wherein the computer program product comprises fifth computer program code for presenting a representation of the alteration of the at least one programming element in the project window.

17. The computer program product of claim 15, wherein the second computer program code identifies changes of size of a graphical object within a state creation display window.

18. The computer program product of claim 15, wherein the second computer program code identifies alteration of graphical features of a graphical object within a state creation display window.

19. The computer program product of claim 18, wherein the graphical features include color.

20. The computer program product of claim 18, wherein the graphical features include image content.

21. The computer program product of claim 15, the second computer program code identifies alteration of at least one of text or text features associated with a graphical object within a state creation display window.

22. The computer program product of claim 15, wherein the programming element includes a function call.

23. The method of claim 22, wherein the function call includes an automatic function call.

24. The computer program product of claim 23, wherein the operand includes data used by the automatic function call, such that when the automatic function call is initiated by a state change of the computer system, the programming element performs its programmed function using the data specified as the operand.

25. The computer program product of claim 22, wherein the operand includes a call given function indicating what function should be executed by the function call programming element.

26. The computer program product of claim 15, wherein the programming element includes a value setting function.

27. The computer program product of claim 15, wherein the operand includes a null operand.

28. A computer-based system comprising:
    memory;
    a display device;
    an input device; and
    a processor coupled to the memory, the display device, and the input device, the processor comprising:
        a first component for generating a graphical user interface and presenting the graphical user interface on the display device, the graphical user interface comprises:
            a graphics layout area for presenting objects selected using the input device;
            a project window for presenting the objects in thumbnail form;
            a state table window for presenting at least one state table having a first dimension and a second dimension, the first dimension configured to identify at least one programming element and the second dimension configured to identify a plurality of states; and
            a button for activating a creation process for a new state within the state table;
        a second component for identifying alteration of at least one programming element associated with one of the presented objects; and
        a third component for automatically determining the programming element being modified graphically by a user, the programming element having one or more parameters;
        a fourth component for automatically determining the one or more parameters of the programming element that was modified;
        a fifth component for automatically including an operand corresponding to the graphically modified programming element and modified parameter into the state table; and
        a sixth component for automatically storing the operand corresponding to the modified parameter of the programming element as a specific state in the state table, wherein the third thru sixth computer program codes are executed during state table creation.

29. The system of claim 28, wherein the processor further comprises a fourth component for storing the states in the state table in the memory.

30. The system of claim 28, wherein the second component identifies movement of a graphical object within the graphics layout area from a location in a previous state.

31. The system of claim 28, wherein the second component identifies changes of size of a graphical object within the graphics layout area, and further wherein the first component comprises an object properties window for presenting the properties of a selected object.

32. The system of claim 28, wherein the second component identifies alteration of graphical features of a graphical object within the graphics layout area.

33. The system of claim 32, wherein the graphical features include color.

34. The system of claim 32, wherein the graphical features include image content.

35. The system of claim 28, the second component identifies alteration of at least one of text or text features associated with a graphical object within the graphics layout area.

36. The system of claim 28, wherein the programming element includes a function call.

37. The system of claim 36, wherein the function call includes an automatic function call.

38. The system of claim 37, wherein the operand includes data used by the automatic function call.

39. The system of claim 36, wherein the operand includes a call given function indicating what function should be executed by the function call programming element.

40. The system of claim 28, wherein the programming element includes a value setting function.

41. The system of claim 28, wherein the operand includes a null operand.

42. The system of claim 28, further comprising a fourth component for sending the state table with stored one or more operands over a broadcast network.

* * * * *